United States Patent [19]

Seidenfaden

[11] Patent Number: 4,504,178
[45] Date of Patent: * Mar. 12, 1985

[54] TOOL FOR TRIMMING OF EDGES

[75] Inventor: Heinz Seidenfaden, Varel, Fed. Rep. of Germany

[73] Assignee: Vereinigte Flugtechnische Werke GmbH, Bremen, Fed. Rep. of Germany

[*] Notice: The portion of the term of this patent subsequent to Jul. 21, 1998 has been disclaimed.

[21] Appl. No.: 215,362

[22] Filed: Dec. 11, 1980

[30] Foreign Application Priority Data

Dec. 11, 1979 [DE] Fed. Rep. of Germany ....... 2949656

[51] Int. Cl.³ .............................................. B23C 1/20
[52] U.S. Cl. .................................... 409/138; 409/180; 409/181; 144/134 D; 51/102

[58] Field of Search ............... 409/218, 180, 181, 182, 409/138, 174–179, 183, 184; 408/67; 51/2 F, 2 L, 2 Y, 102, 116, 165, 166 TS, 341, 386, 205, 210, 238, 241, 170 PT, 176; 299/39, 41; 29/76 R; 144/134 D, 136 C

[56] References Cited

U.S. PATENT DOCUMENTS 3,212,541 10/1965 Burrows et al. .................... 409/138

FOREIGN PATENT DOCUMENTS 504928 10/1951 Belgium ............................... 299/41

Primary Examiner—William R. Briggs
Assistant Examiner—Thomas M. Kline
Attorney, Agent, or Firm—Ralf H. Siegemund

[57] ABSTRACT

The tool includes a handle containing a motor whose shaft extends from a tool head and carries a ball-shaped or a barrel-shaped cutter. A cantilever arm extends from the tool head and has a guide element cantilevered from its free end. The guide element is pivoted about one or two axes, extending at right angles to the axis of cutter rotation.

12 Claims, 12 Drawing Figures

TOOL FOR TRIMMING OF EDGES

BACKGROUND OF THE INVENTION

The present invention relates to a tool or device for deburring, chamfering, trimming, and removing edges, fins, or the like; and more particularly, the invention relates to improvements of a tool of this type, such as shown and disclosed in my earlier patent (application Ser. No. 102,037, filed Dec. 10, 1979) now U.S. Pat. No. 4,279,554.

My earlier patent discloses a motor-driven, spherical cutter, rotating about an axis which traverses the center of the cutter; a guide member is provided to receive the cutter, the guide member has a slot to position the workpiece relative to the cutter and is mounted for pivoting on an axis traversing the cutter axis by a 90° angle and at least approximately at the cutter's center. This particular tool permits, e.g., chamfering or deburring without carving flutes or grooves into the workpiece, particularly at the edges being worked. The tool is not limited in its application to working straight edges; but the edges may to some extent be curved or have a more complex contour. However, there are certain limitations here with regard to rather sharply concave-curved edges.

DESCRIPTION OF THE INVENTION

It is an object of the present invention to improve a tool of my earlier patent (supra) which permits working of rather sharply concave-curved edges.

It is a more general object of the present invention to improve a tool for deburring or chamfering edges in which a motor-driven cutter cooperates with a guide member having a slot, e.g., an arcuate slot.

It is a specific object of the present invention to provide a new and improved tool for deburring or chamfering edges and including a tool support with a head from which extends a motor-driven shaft carrying a cutter element.

In accordance with the preferred embodiment of the present invention, it is suggested to improve the tool as per the specific object, by providing a holding element that extends from the tool head in cantilever fashion and carries a journal pin by means of which a guide element, receiving the cutter element and having a support slot for the workpiece, is cantilevered on the holding element and journalled for pivoting on an axis which extends transversely to the axis of rotation. The pivot axis may either be directed toward the cutter element intersecting the axis of rotation. Alternatively, the pivot axis may extend at a distance from that axis. If the cutter element is a spherical cutter, then the two axes intersect in the center of the sphere; if the cutter element is of barrel-shaped configuration, then the two axes are spaced apart so that pivoting occurs on a surface line (generatrix) of the barrel. The barrel-shaped cutter is preferred for very tight edge contours because the cutter ball must not be too small, or otherwise the edge will be concavely chamfered.

It is decisive that the guide element be pivotally held by means of one pivot pin only for pivoting on one axis and being linked to the element from one side only, i.e., it is a cantilevered pivot pin mount. This feature permits the cutter and the guide element to negotiate very tight edge curves. The tool can be held so that the journal pin faces away from the point of cutting, i.e., has a diametrically opposed position and extension as far as the journal mount and pin are concerned. The workpiece is never in the way of the tool. Moreover, one can pivot the tool in a plane transverse to the cutting edge, either by (manually) pivoting the tool as a whole, the guide member inherently following that pivot motion; or one may provide for such additional pivoting on the tool in that the first-mentioned pivot pin does not directly mount the guide member pivotally, but a mounting element which, in turn, carries another, single pivot pin extending at right angles to the first one (and to the axis of rotation of the cutter), and that latter pin now journals the guide element directly. This is, in effect, a simplified double-cantilever cordon mount.

The guide element is to be of cylindrical configuration, with an arcuate, V-shaped slot that extends well over 180°, e.g., 270°. Such a guide member or element is well suited to hold a workpiece, particularly as far as guiding sharp, concave contours is concerned and can be run therealong at a continuous, steady work pace.

Another improvement feature relates to the adjustment of the guide element and member toward and away from the axis of rotation. Also, the holding element should be mounted for adjustment in the direction of extension of the axis of rotation of the cutter. Various parts should be provided with stops to limit pivot ranges in order to avoid, for example, hitting the motor and cutter shaft.

The preferred embodiment of the invention, the objects and features of the invention, and further objects, features and advantages thereof, will be better understood from the following description taken in connection with the accompanying drawings.

DESCRIPTION OF THE DRAWINGS

Proceeding now to the detailed description of the drawings, FIGS. 1 and 2 show a handle 1 which contains a drive motor and serves as the mount for a tool head, mount 3a being fastened to the handle by means of a cap screw 2. A tool head 3 is sitting on a guide sleeve 7 which extends from head mount 3a. Tool head 3 can turn on the sleeve, but a set screw 8 may fasten the tool head to the sleeve.

Figure 1:
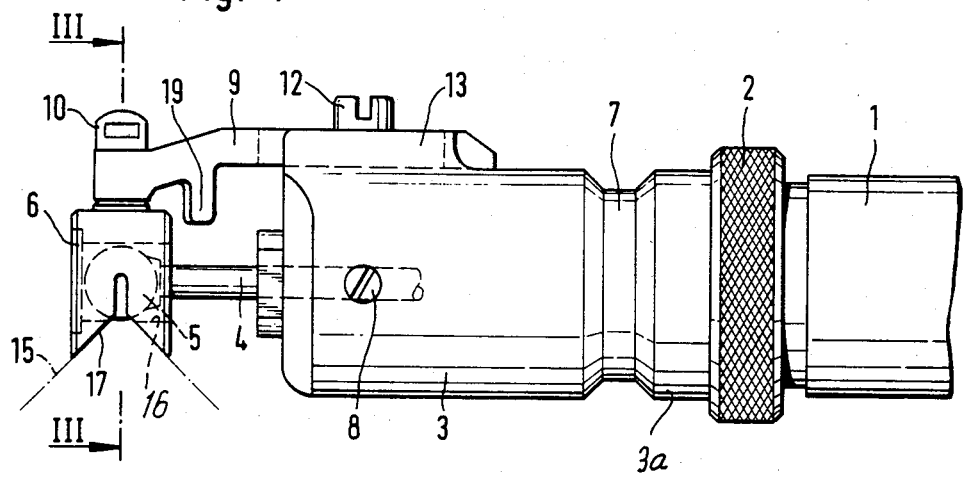
FIG. 1 shows a side elevation of a tool in accordance with the preferred embodiment of the present invention for practicing the best mode thereof by means of a spherical cutter.

As indicated in parts by phantom lines, a motor-driven shaft 4 extends through a tool head 3 and carries on its front end a ball or spherical cutter 5. Tool head 3, when not fastened to sleeve 7, can rotate about the shaft's axis. The ball cutter is situated inside a cylindrical mounting bore or cavity 16 of a guide member 6 which, in turn, is mounted to head 3 in an overhanging, cantilever fashion.

A bridge and mounting or holding bar 9 extends from tool head 3 in a forward direction, the guide member 6 being pivotally mounted to the bar by means of a pivot pin 10. Specifically, guide member 6 is cantilevered by pin 10 from the end of cantilever-mounting bar 9. The bar or bridge 9 has an oblong slot 11 by means of which the bridge is fastened (screw 12) to the tool head 3 in a manner permitting (axial) forward adjustment of the head 6 over a range given by the length of the slit. Longitudinal guide ridges 13, being integral with or secured to tool head 3, define a bed for the bar 9 in order to prevent its turning on the axis of screw 12.

The guide member 6 is positioned by means of bar 9 so that it may, indeed, receive the ball 5 as mounted to the end of shaft 4. The mounting position is such that the pivot axis 14 of pin 10 traverses the center of the spherical cutter 5 and intersects, at right angles, the axis of rotation of shaft 4 and cutter 5 at that center.

The guide member 6 is of cylindrical configuration, the cylinder axis being coaxial with the axis of bore 16 and of shaft 4 when the ball cutter is properly supported by and in the member 6. This member 6 has a bore 18 which receives one end of journal pin 10. Accordingly, the pin 10 and its axis 14 extend laterally from that cylinder; the axis is, in particular, traversing the outer cylinder surface of member 6 at right angles. Aside from the cylindrical opening 16, member 6 is also provided, along a portion of its periphery, with a slot 17 being defined by bevelled, curved edges, the slot having therefore a V-shaped cross section. The bottom of the V extends into and through the cylindrical surface of opening 16. Slot 17 covers approximately 75% of the periphery of member 6; i.e., it has an angle of approximately 270°. As a rule, that angle should preferably be well in excess of 180°. The V has an angle of approximately 90° and is provided in order to receive a correspondingly contoured edge of a workpiece 15.

The bore 18 is located in that portion of member 6 which is not traversed by groove 17. The angular range of pivoting of member 6 about axis 14 is limited by a stop 19 which projects from arm 9. This stop 19 prevents, in particular, the bore 16 from hitting shaft 4, carrying the cutter ball 5.

Figure 3:
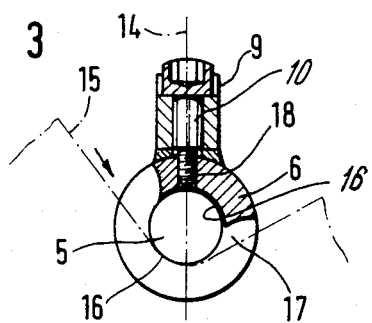
FIG. 3 is a section view as indicated by line III—III in FIG. 1.

Deburring or chamfering of a workpiece edge is carried out in the following manner. The workpiece 15 is oriented in such a way that the pivot axis 14 will run at least approximately parallel to the edge of workpiece 15, to be worked as the tool is moved along. This disposition permits pivoting of the tool as a whole relative to workpiece 15 within a plane which extends at approximately right angles to the edge being worked, at the location and point of working (16'). The tool can be pivoted in that manner without disengagement of the guide member (slot 17) from the edge. The tool will preferably be held in such a way that pin 10 is positioned ahead of the guide member 6—as seen in the direction of working (see arrow). Sharply concave contours (as depicted in FIG. 3) will still permit, and require, turning of the tool about the axis of shaft 4; but generally, the pin 10 faces away from the edge (corner) to be worked and will not hit any portion of the edge (FIG. 3). The "sharpest" corner that can be worked is determined by the guide member 6 and, in particular, by the radius of the bottom of the V-groove as looping around the cylinder's axis of bore 16, which is about the same as the radius of that bore which, in turn, is about the same as the radius of the cutter ball. The latter's radius is the practical limit; reaching that limit as closely as possible is determined by the guide member 6 and its guide slot 17.

As stated, the guide member 6 can be pivoted about the axis 14. Aside therefrom, the tool as a whole can be turned on the axis of shaft 4 (being transverse to FIG. 3); and the tool can, further, be pivoted as a whole about the horizontal axis in FIG. 3, extending at a right angle to the vertically drawn axis 14.

Figure 7:
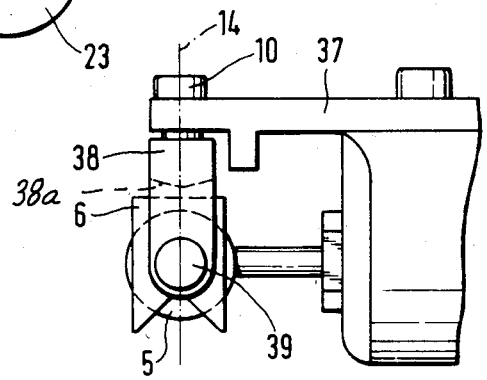
FIG. 7 is a side elevation of a modification of the tool shown in FIG. 1.
Figure 8:
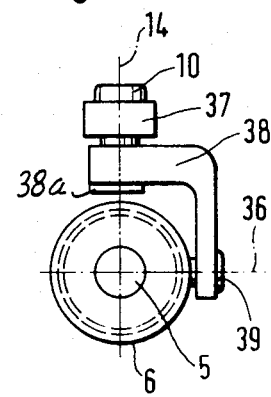
FIG. 8 is a front view of the tool shown in FIG. 7.
Figure 9:
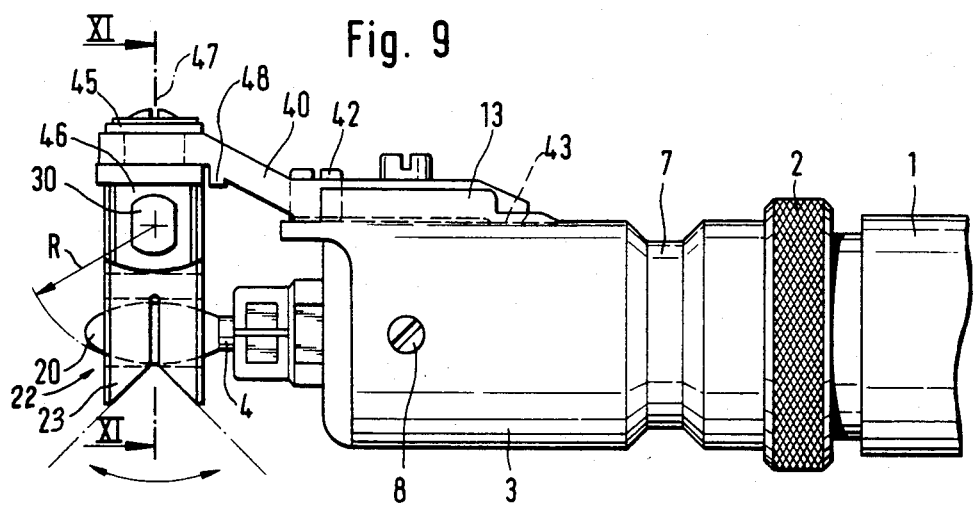
FIG. 9 is a side elevation of a modification of the tool shown in FIG. 4.
Figure 10:
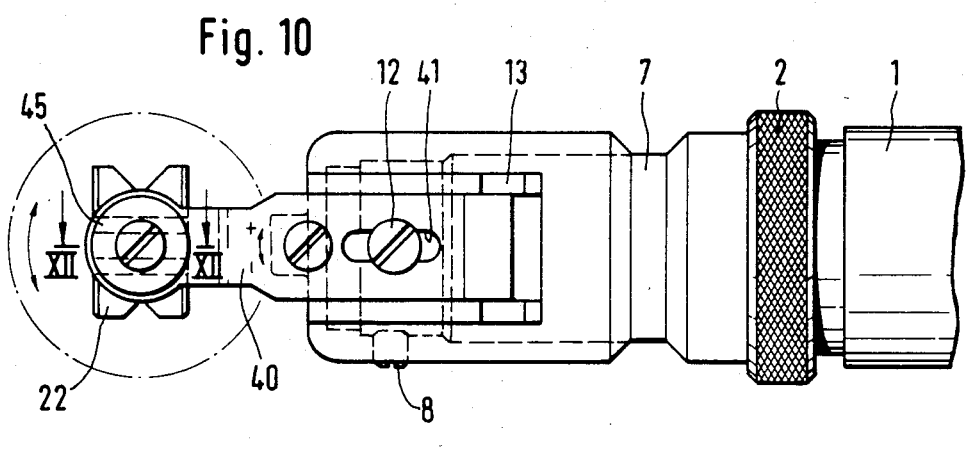
FIG. 10 is a top elevation of the tool shown in FIG. 9.
Figure 11:
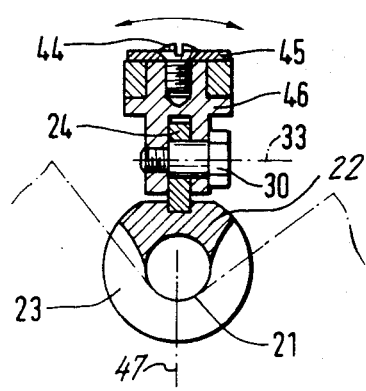
FIG. 11 is a section view taken along line XI—XI in FIG. 10.
Figure 12:
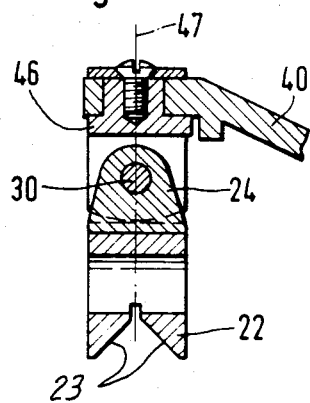
FIG. 12 illustrates a section through a detail of a plane parallel to the plane of FIG. 10.

FIGS. 7 and 8 illustrate a modification, permitting the guide member to be pivoted about any axis in a plane at right angles to the axis of rotation of the cutter. To achieve this, a second axis of pivoting is established, being at right angles to both, the axis of rotation of the cutter and the pivot axis of and by the pin 10.

FIGS. 7 and 8 illustrate the replacement of bar 9 by a bar 37, having also an oblong slot for fastening tool head 3 in an axially adjustable manner (i.e., parallel to the axis of shaft 4). Bar 37 is not crimped as compared to bar 9, but they are otherwise quite similar in construction. Particularly, journal pin 10 is mounted to the front end of bar 37, i.e., cantilevered therefrom; but it carries a holding element 38 of L-shaped contour (FIG. 8).

The element 38 is, thus, pivotably mounted, for pivoting on the axis 14. Element 38, in turn, supports a pivot pin 39, establishing a second pivot axis, 36. The guide element 6 itself is mounted in such a way that its bore 18 receives the journal pin 39 (rather than pin 10). Thus, the guide element 6 can be pivoted about axes 14 and 36 so that it can, in fact, be pivoted about any axis in the plane as defined by the axes 14 and 36; this plane intersects the plane of rotation of the tool at right angles. Moreover, the axes 14 and 36 intersect in the center of the cutter ball 5. The oblique faces 38a serve as abutment stops to limit pivoting of the element 6.

Figure 2:
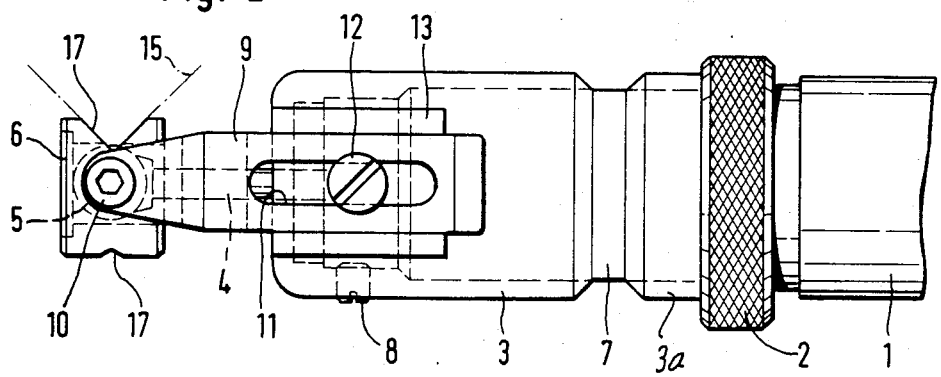
FIG. 2 presents a top elevation of the tool shown in FIG. 1.
Figure 4:
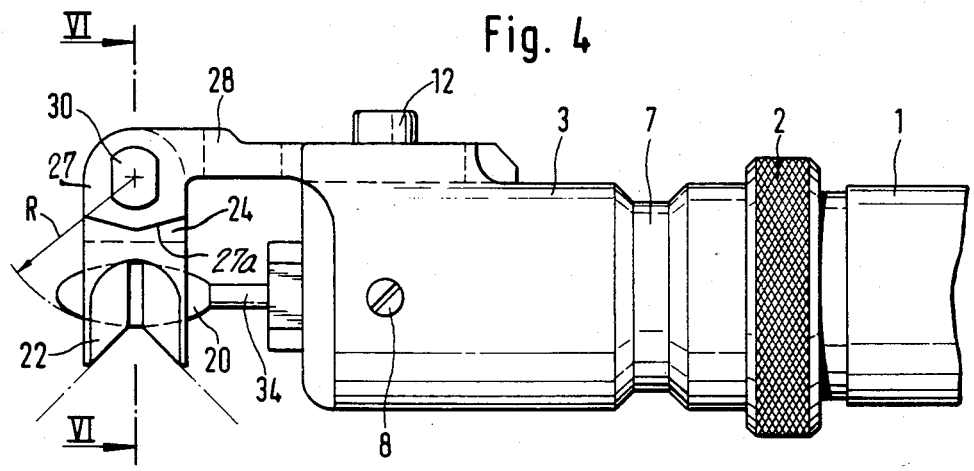
FIG. 4 is a side elevation of a tool with a barrel-shaped cutter, having many of the features of the tool shown in FIG. 1.
Figure 5:
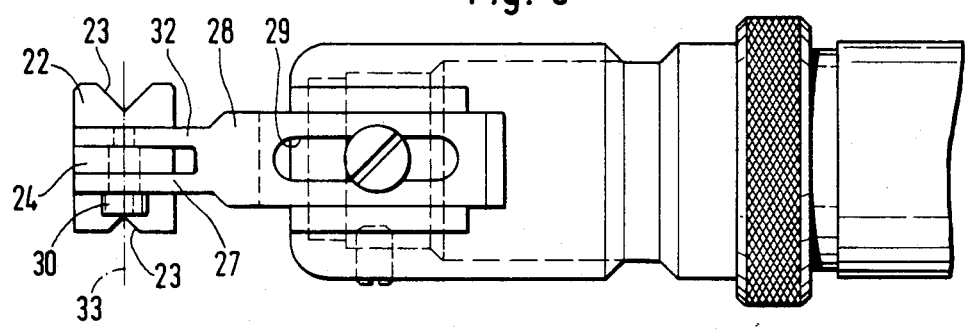
FIG. 5 is a top elevation of the tool shown in FIG. 4.
Figure 6:
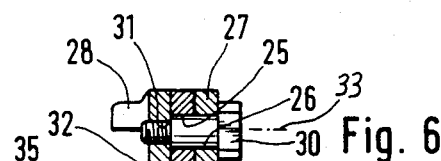
FIG. 6 is a section view taken along line VI—VI in FIG. 4.

The device shown in FIGS. 4, 5, and 6 permits working of still tighter or sharper concave corners of workpieces. The elements 1, 2, 3, 7, and 8 are of the same construction as those shown in FIGS. 1 and 2. These parts can, therefore, be construed as being basic elements; and the elements to be described next are, e.g., exchange elements, or alternative elements from an assembly point of view.

The cutter in this case is a barrel-shaped cutting element 20 mounted on a relatively thin motor shaft 34. This type of cutter has a smaller diameter in the plane of rotation, for a similarly effective curvature insofar as chamfering is concerned, established by the barrel's radius (R) in any plane that includes the axis of rotation.

The cutter 20 cooperates with and is disposed in a cylindrical bore 21 of a guide element 22. This element and its bore are smaller in diameter than that of guide element 6 as per FIG. 1, but the overal constructions are similar.

Element 22 is also of a cylindrical configuration and is provided with a slot 23, having a V-shaped cross section and extending for approximately 270° around the circumference of the element. The V-shaped slot has also an angle of approximately 90°. A flat, short bar 24 extends radially from element 22 and is secured thereto. This bar 24 is traversed by a bore 25 in a direction transverse to the axis of cylindrical bore 21. The center of bore 25 coincides with the center of the curvature of barrel cutter 20 (the radius R in FIG. 4), provided, of course, that the element 22 does have the requisite disposition in relation to the cutter.

The bore 25 of plate or bar 24 is aligned with bores 26 and 31, respectively, in the legs 27 and 32 of a fork at the end of mounting bar 28. This bar 28 is also provided with an elongated slot 29 traversed by the screw 12, by means of which this bar is affixed to tool head 3. Again, this manner of mounting permits adjustment of the disposition of guide member 22 in the direction of the axis of shaft 34 and of the cutter.

A pivot pin 30 traverses bores 25 and 26. Bore 31 in the one fork prong, 32, is threaded and threadedly receives a smaller diameter but threaded end portion of the pin 30. The pin 30 pivotally mounts element and member 22 for pivoting about the pin's axis 33 which, as stated, extends at right angles to the axis of rotation of the cutter. The two axes are spaced apart by a distance which is given by the radius R as defined, reduced by the maximum radius of cutter 20 in relation to its axis of rotation. These particular design parameter relations establish a constant distance between the surface of barrel cutter 20 and the guide slot 23, even when guide member 22 pivots about axis 33. Accordingly, the cutting depth in workpiece 35 remains constant, i.e., invariant to pivot motions of the guide slot about the axis 33, in a plane parallel to the plane of the drawing shown in FIG. 4. The pivot range of guide member 22 about axis 33 is limited by the fork legs 27 and 32 of bar 28. The fork legs have a shallow, V-shaped contour (27a) where facing the guide member 22; and these V-shaped surface portions serve as abutment stops of the pivoting guide member 22.

In operation, i.e., for chamfering or deburring, the tool is placed in relation to a workpiece 35 (presumed to have a concave edge) so that the pin 30 and holding bar 28 face away from the workpiece and its edge; but the axis 33 should run, at least approximately, parallel to the local point of working. Also, the tool as a whole should be held in a way that permits pivoting in a plane transversely to the edge (which is a plane transverse to the plane shown in FIG. 6), without disengagement of the cutter from the edge being worked.

FIGS. 9 through 12 illustrate a modification of the tool shown in FIGS. 4, 5, and 6, permitting additional pivoting in a universal manner. Also, the degree or extent of chamfering can be adjusted. FIGS. 9 to 12 show several elements using similar identification numbers as used in other embodiments; these parts and elements are, indeed, similar, even identical. The bar 28 of FIG. 4, however, has been replaced by a crimped part and holding bar 40, having also an oblong slot 41 for fastening to tool head 3 (screw 12). The guide element, 22, is also of similar construction, but is differently mounted.

The middle portion of bar 40 is provided with a threaded bore receiving an adjusting screw 42 for adjusting the rate and extent of chamfering. The screw 42, in particular, permits lifting the bar off tool head 3 to, thereby, ultimately adjust the periphery of cutter 20 relative to the guide member 22 and its guide slot 23.

The front end of bar 40 is contoured for receiving a sleeve-like extension of a mounting element 46. A screw 44, in conjunction with a shim or washer 45, fastens element 46 to the bar 40. The element 46 remains, however, pivotable about an axis 47. The pivot range of mounting element 46 about this axis is limited by a nose 48.

Element 46 is U-shaped, facing down, its two legs being provided with axially aligned bores receiving the journal pin 30 by means of which guide element 22 is connected to the element 46. The pin 30 establishes the pivot axis 33, intersecting the second pivot axis. Accordingly, pivoting of the guide member 22 is now permitted about any axis in a plane extending at right angles to the axis of rotation of the cutter. Pivoting about axis 33 is again carried out at the distance R to the cutter's surface, being its radius of curvature in any plane that includes the axis of rotation of the cutter.

The invention is not limited to the embodiments described above; but all changes and modifications thereof, not constituting departures from the spirit and scope of the invention, are intended to be included.

I claim:

1. A machine tool for chamfering, deburring, and trimming edges, or the like, of a workpiece, there being a tool support means, including a motor-driven shaft and a tool head, the shaft projecting from the tool head, further including a cutter element mounted for rotation and rotating about a first axis, being the axis of the shaft, the improvement comprising:

a holding means mounted to the tool head extending therefrom and essentially parallel to the shaft;

a guide member having an arcuate slot having a V-shaped cross section, being defined by bevelled curved edges and extending in a plane of curvature, the member being of hollow construction for receiving the cutter element; and a journal pin located to one side of the cutter element for pivotally mounting the guide member on the holding means so that the guide member extends from the holding means toward and receives the cutter element and is cantilevered in relation to the holding means, the pin establishing a first pivot axis extending at right angles to said first axis, the guide member being capable of pivoting about the first pivot axis, thereby pivoting the plane of the arcurate slot.

2. A tool as in claim 1, the holding means including a bar having an oblong slot, being traversed by a fastener element for adjustably mounting the bar to the tool head.

3. A machine tool for chamfering, deburring, and trimming of edges, or the like, of a workpiece, there being a tool support means, including a motor-driven shaft and a tool head, the shaft projecting from the tool head, further including a cutter element mounted for rotation and rotating about a first axis, being the axis of the shaft, the improvement comprising:

a cantilevered bar extending from the head, generally parallel to the axis of rotation;

a journal pin located to one side of the cutter element and extending from a free end of the bar toward the cutter element and having a pivot axis intersecting the axis of rotation; and a guide element having an arcuate slot having a V-shaped cross section, being defined by bevelled curved edges and extending in a plane of curvature, the member being of hollow construction for receiving the cutter element, the guide element disposed so that the edges defining the slot loop around the cutter element in the plane, the pin extending in said plane, the slot facing away from the pin, the guide element being mounted to the pin for pivoting on the pivot axis and being cantilevered by the pin in relation to said bar.

4. A machine tool for chamfering, deburring, and trimming of edges, or the like, of a workpiece, there being a tool support means, including a motor-driven shaft and a tool head, the shaft projecting from the tool head, further including a cutter element mounted for rotation and rotating about a first axis, being the axis of the shaft, the improvement comprising:

a cantilevered bar extending from the tool head, generally parallel to the axis of rotation;

a journal pin located to one side of the cutter element and having a pivot axis and disposed in a free end of the bar, said pin extending at right angles to the axis of rotation but being spaced therefrom; and a guide element having an arcuate slot having a V-shaped cross section, being defined by bevelled curved edges and extending in a plane of curvature, the member being of hollow construction for receiving the cutter element and being disposed so that the edges defining the slot loop around the cutter element in a plane that includes the pivot axis, the guide element being cantilevered to said bar by means of said pin, thereby being mounted for pivoting about the axis of the journal pin, pivoting to occur so that said plane as defined by said slot assumes different pivot positions.

5. A machine tool for chamfering, deburring, and trimming of edges, or the like, of a workpiece, there being a tool support means, including a motor-driven shaft and a tool head, the shaft projecting from the tool head, further including a cutter element mounted for rotation and rotating about a first axis, being the axis of the shaft, the improvement comprising:

a cantilevered bar extending from the tool head and in direction generally parallel to the axis of rotation;

a journal pin in a free end of the bar, being located to one side of the cutter element and having a first axis for pivoting, said first pivoting axis extending at right angles to the axis of rotation of the cutter element; and a guide member connected to said pin and disposed for pivoting on said first axis for pivoting, said pin cantilevering the guide member to said bar so that the guide member extends toward said cutter element, said guide member having an arcuate slot having a V-shaped cross section, being defined by bevelled curved edges and extending in a plane of curvature, the member being of hollow construction for receiving the cutter element and looping in parts around said cutter element, said slot facing generally away from said pin.

6. A tool as in claim 1 or 5, said first pivot axis extending toward said cutter element, intersecting the axis of rotation, the guide element turning and pivoting on said pin.

7. A tool as in claim 2, the bar including stop means for limiting pivoting of the guide element.

8. A tool as in claim 1, 3, 4, or 5 including a mounting element mounted to the pin for pivoting about the first pivot axis, and a second journal pin having a second axis extending at right angles to the first axis and to the first pivot axis for mounting the guide member to be pivotable also about the second axis.

9. A tool as in claim 1, 3, or 5, the cutter element being a spherical cutter, said axes intersecting in a center of the spherical cutter.

10. A tool as in claim 1, 4, or 5, the cutter element being a barrel-shaped cutter, the first pivot axis being spaced at a distance from the first axis, the distance being selected so that the guide member pivots along a surface line (genetrix) of the cutter.

11. A tool as in claim 8, the cutter element being a barrel-shaped cutter, the first pivot axis being spaced at a distance from the first axis, the distance being selected so that the guide member pivots along a surface line (generatrix) of the cutter, the second axis intersecting both said first and said first pivot axes.

12. A tool as in claim 5, said first pivot axis being spaced from said axis of rotation, there being a mounting element for connecting the guide element to the pivot pin, thereby extending from the bar toward the cutter element, at right angles to the first pivot axis.

* * * * *